Aug. 27, 1946. H. VON HORTENAU 2,406,723
FLUID QUANTITY MEASURING DEVICE
Filed Sept. 6, 1944 2 Sheets-Sheet 1
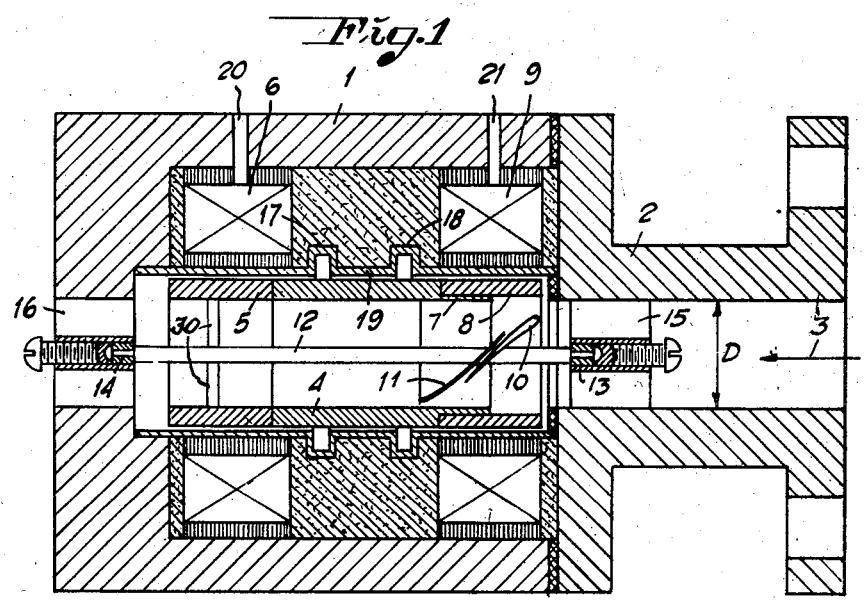

Aug. 27, 1946.  H. VON HORTENAU  2,406,723
FLUID QUANTITY MEASURING DEVICE
Filed Sept. 6, 1944   2 Sheets-Sheet 2
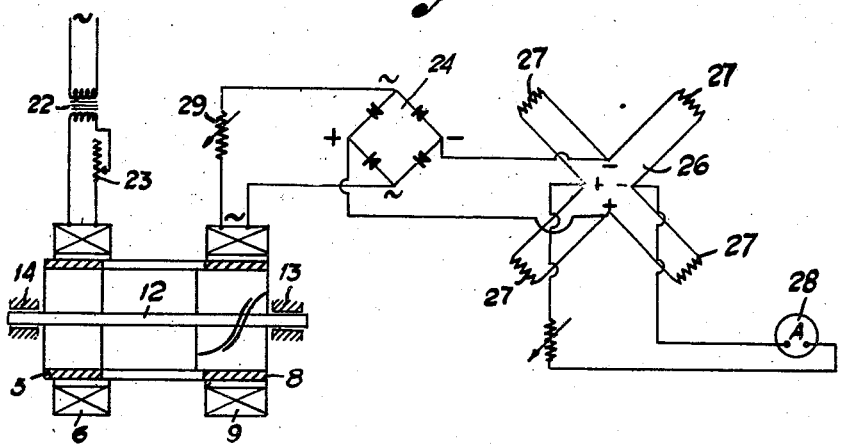

Patented Aug. 27, 1946

2,406,723

UNITED STATES PATENT OFFICE 2,406,723

FLUID QUANTITY MEASURING DEVICE

Hans von Hortenau, Stockholm, Sweden, assignor to Stig K. M. Billman, Stockholm, Sweden Application September 6, 1944, Serial No. 552,878
In Sweden October 19, 1943

8 Claims. (Cl. 73—231)

The present invention relates to a fluid quantity measuring device and particularly to means for measuring the quantity of a fluid passing through a conduit, said means including a turbine provided in the conduit and driven by the fluid, and an electric generator driven by said turbine. The invention particularly relates to means for measuring the quantity of water flowing through a conduit in combination with temperature measuring means for determining the heat quantity consumed in a heating system, such as a hot water system, said heat quantity being constituted by the product of the water quantity flowing under a certain period through the system and the temperature drop occurring during said period.

Known heat quantity measuring devices of the type referred to generally comprise a so-called Woltmann turbine system by means of which an electric current is generated the voltage of which is proportional to the quantity of water and which either mechanically, for instance, by means of a clock-work, a lever mechanism or chopper bar mechanism, or electrically, for instance, by means of an electric balance or a Wheatstone bridge, is in such a manner multiplied with the reduction of the temperature determined by a thermometer, resistance thermometer or thermo-couple, that the integral of the product, that is the quantity of water multiplied with the temperature drop, constitutes the quantity of heat consumed. Devices of the kind indicated suffer, however, from a number of inconveniences which constitute material obstacles to the use of such devices to a large extent. In the following, there are indicated some of these inconveniences.

The transmission of movement from the conduit through which the water flows to the outside of the conduit must be effected through packing devices which result in losses due to friction and leakage and on account thereof deteriorate the accuracy of the measurement. A further deterioration of accuracy is due to a relatively great number of movable parts which result in plays and frictional losses. Devices of known construction are further not able exactly to measure the whole quantity of water flowing through the conduit, and large pressure losses and other difficulties are encountered in case of small quantities of water. If the mass or weight of the turbine body is greater than in common Woltmann turbine systems, the characteristic of the water quantity curve will not be linearly proportional to the quantity of water, and variations by a certain percentage of the real water quantity will, consequently, not correspond to variations by the same percentage of the quantity indicated. A still further serious inconvenience is constituted by the difficulty to counterbalance or at least to reduce the bearing thrust of the turbine. The subsequent adjustment of the device, which is necessary for the compensation for changes in the bearings and in the characteristic of the rectifier, is complicated and connected with difficulties. Still further inconveniences are encountered in the assembling of the turbine and in testing the same in a dry state, and it is further difficult to vary the characteristic of the turbine by adjusting the turbine blades or vanes.

The present invention has for its object to avoid the above named inconveniences.

I attain this object by mechanism illustrated in the accompanying drawings, in which—

Fig. 1 is a central section of an embodiment of the invention; Fig. 2 is a diagram showing the relationship between fluid velocity and voltage produced; Fig. 3 is a wiring diagram for the embodiment shown in Fig. 1.

The water quantity measuring device is arranged in a casing 1 provided with a connecting branch 2 and inserted in a conduit, not shown, the inner diameter of which is indicated at D, water flowing through said conduit in the direction denoted by the arrow 3. In the casing 1, there is provided a tube 4 which may consist of brass or the like material and which at one end is connected with a tubular member 5 which constitutes a short-circuited rotor of an induction motor fed with constant alternating E. M. F. and constant frequency. Numeral 6 indicates the stator of the induction motor. At its other end, the tube 4 has an elongated portion 7 of reduced outer diameter. On the portion 7 there is clamped a magnet system 8 of an electric generator the stator of which is indicated at 9. The magnet preferably consists of a heat-proof special alloy having a small reversible permeability, in order to prevent the magnet from being materially weakened by the alternating field produced. The blades or vanes of the turbine consist of separate parts 10 and 11, one of said parts being connected with the rotor 5 and the other one with the tubular intermediate member 4. As will be seen from the drawing, the inlet edges of the blades are rounded off in order to reduce losses due to shocks resulting from varying inlet angles of the water. The rotatable members described are mounted on a central shaft 12 of a stainless material by means of spokes 30, said shaft being inserted through holes in the blades 10, 11 and mounted in two bearings 13 and 14 providing as low frictional resistance as possible. The bearings are carried by ribs or webs 15 and 16, respectively. The webs 15 located in advance of the turbine, as viewed in the direction of flow of the water, are devised as guide vanes for the turbine. Between the parts 4, 5, 8 and the stators 6 and 9 there is provided a tube 19 consisting of non-magnetic material, such as brass, and having outwardly directed projections 17 and 18. The tube 19 extends throughout the entire length of the casing and serves as a labyrinth packing between the inlet and outlet of the turbine, in order to reduce as far as possible leakage losses through the annular clearances between the movable and stationary parts of the measuring device. Numerals 20 and 21 indicate openings in the casing 1 for the electrical conductors to the stators of the induction motor and generator, respectively. As will be seen from the drawings, the inner diameters of the parts 4, 5, 8 are substantially equal to the inner diameter D of the conduit.

The motor winding is fed from the power source through a transformer 22 and an adjustable resistance 23 for varying the voltage (see Fig. 3). The stator 6 is axially displaced relative to the rotor 5. As a result thereof, the rotor 5 will be subject to an axial thrust which counteracts the axial bearing thrust of the shaft 12 and consequently reduces the bearing friction.

Due to the mass or weight of the rotatable parts and on account of other factors, such as the resistance of the rectifier, the action of water velocity components upon the turbine, the characteristic of the voltage in the generator 9 as a function of the water velocity has such a course that variations by a certain percentage of the water quantity will not correspond to variations by the same percentage of the generator voltage. Further, the smallest quantity of water which is necessary in order to start the turbine and have the same continue to rotate, is not as small as the water quantity which in certain cases occurs in practice, for instance in hot water systems operating according to the thermo-syphon principle. The characteristic obtained with the device illustrated without the motor 5, 6 is consequently represented, by way of example, by the line $a$ in the diagram shown in Fig. 2, in which the abscissae represent the velocity $v$ of the water, that is the water quantity per unit of time, while the ordinates represent the voltage $E$ produced in the generator 9. As is apparent from Fig. 2, the curve $a$ is linear, but not directed towards zero. Consequently, the rotatable system, that is the turbine and the rotor of the generator, will begin to rotate only when the velocity of the water has attained a certain value $v_a$. As a result thereof, a variation by a certain percentage of the water velocity will not correspond to a variation by the same percentage of the generator voltage, and, consequently, the measuring results obtained will depart from the actual values.

This source of errors is avoided due to the phase lag of the induction motor which eliminates a great portion of the various resistance forces acting upon the rotatable system, such as weight or mass, bearing friction, action between the magnet poles and the stator etc. As a result thereof, the rotatable system will commence to start at a lower water velocity than it would without the influence of the induction motor. Through suitable choice of the adjustable alternating E. M. F. in said motor, the point A (see Fig. 2) can be displaced until zero. As the water velocity increases, the phase lag will be reduced, and at a certain water velocity $v_x$, the motor 5, 6 will begin to brake the rotatable system. The braking action will increase as the water velocity increases. In this way the characteristic $b$ will be obtained, from which it will be seen, that the generator voltage will be exactly linearly proportional to the water velocity and, consequently, to the water quantity flowing through the conduit per unit of time.

The induction motor is further of great importance with respect to subsequent adjusting of the measuring device and with respect to the assembling and adjusting in the manufacture, since it will be possible by increasing the voltage to rotate the system for testing and controlling purposes without the necessity of driving the turbine by means of water.

The characteristic of the turbine may be changed by manually rotating the rotor 8 through a certain angle relative to the tubular member 4 so as to vary the total length of the blades 10, 11. The tubular member 4 and rotor 8 are frictionally connected so that these parts may be turned relative to each other. When such turning takes place the blade 10 bears against the blade 11 so as to simultaneously displace the member 4 and rotor 8 axially away from each other in order that the combined length thereof is slightly increased and a circumferential groove is formed radially outside the elongated portion 7 of reduced outer diameter.

The current produced by the generator is rectified in known manner by means of a rectifier 24 (Fig. 3). By means of a variable resistance 29 in the circuit, the inclination of the characteristic with respect to the abscissae may be varied, as indicated by the systems of lines $a$—$d$—$e$ or $c$—$b$.

In order to determine the heat consumed, the current passes to a Wheatstone bridge which consists either of four temperature responsive resistances or of two temperature responsive and two constant resistances indicated at 27. If electrolytic resistances are used instead of wire resistances, the rectifier 24 can be omitted. Numeral 28 denotes an ammeter or an integrating electrolytic meter which indicates the heat consumed.

It will be obvious that the invention is not limited to the embodiment illustrated and described by way of example and may be applied for other purposes than heat measuring devices.

What I claim is:

1. A fluid quantity measuring device adapted to be inserted in a fluid conduit and including a shaft rotatable in said conduit, a turbine mounted on said shaft, an electric generator having a stator and a rotor mechanically connected with said turbine, an induction motor having a stator and a short-circuited rotor mechanically connected with said generator rotor, and means for feeding said induction motor with constant alternating E. M. F. of constant frequency.

2. A fluid quantity measuring device adapted to be inserted in a fluid conduit and including a shaft rotatable in said conduit, a turbine mounted on said shaft, an electric generator having a stator and a rotor mechanically connected with said turbine, an induction motor having a stator and a short-circuited rotor, means for feeding said induction motor with constant alternating E. M. F. of constant frequency, and means for mechanically interconnecting said rotors, the inner diameters of said rotors and said interconnecting means being substantially equal to the inner diameter of said conduit.

3. A fluid quantity measuring device adapted to be inserted in a fluid conduit and including a shaft rotatable in said conduit, a turbine mounted on said shaft, an electric generator having a stator and a rotor mechanically connected with said turbine, an induction motor having a stator and a short-circuited rotor, means for feeding said induction motor with constant alternating E. M. F. of constant frequency, means for mechanically interconnecting said rotors, two bearings for said shaft, one of said bearings being located laterally of said generator rotor, the other one of said bearings being located laterally of said short-circuited rotor, and substantially radial webs for carrying the bearing located in advance of said turbine as viewed in the direction of flow of the fluid, said webs being shaped as guide vanes for said turbine.

4. A fluid quantity measuring device adapted to be inserted in a fluid conduit and including a shaft rotatable in said conduit, a turbine mounted on said shaft, an electric generator having a stator and a rotor mechanically connected with said turbine, an induction motor having a stator and a short-circuited rotor, means for feeding said induction motor with constant alternating E. M. F. of constant frequency, and means for mechanically interconnecting said rotors, the stator and rotor of said induction motor being displaced axially relative to each other to counteract the bearing thrust of said shaft.

5. A fluid quantity measuring device adapted to be inserted in a fluid conduit and including a shaft rotatable in said conduit, a turbine mounted on said shaft, an electric generator having a stator and a rotor mechanically connected with said turbine, an induction motor having a stator and a short-circuited rotor, means for feeding said induction motor with constant alternating E. M. F. of constant frequency, means for mechanically interconnecting said rotors, and a casing forming part of said conduit and enclosing said shaft, turbine, generator and motor.

6. A fluid quantity measuring device adapted to be inserted in a fluid conduit and including a shaft rotatable in said conduit, a turbine mounted on said shaft, an electric generator having a stator and a rotor mechanically connected with said turbine, an induction motor having a stator and a short-circuited rotor, means for feeding said induction motor with constant alternating E. M. F. of constant frequency, means for mechanically interconnecting said rotors, and a tubular member disposed between said rotors and said stators and having outwardly directed projections to constitute a labyrinth packing.

7. A fluid quantity measuring device adapted to be inserted in a fluid conduit and including a shaft rotatable in said conduit, a turbine mounted on said shaft, an electric generator having a stator and a rotor mechanically connected with said turbine, an induction motor having a stator and a short-circuited rotor, means for feeding said induction motor with constant alternating E. M. F. of constant frequency, and means for mechanically interconnecting said rotors, said turbine including moving blades consisting of separate parts rotatable relative to each other.

8. A fluid quantity measuring device adapted to be inserted in a fluid conduit and including a shaft rotatable in said conduit, a turbine mounted on said shaft, an electric generator having a stator and a rotor mechanically connected with said turbine, an induction motor having a stator and a short-circuited rotor, means for feeding said induction motor with constant alternating E. M. F. of constant frequency, means for mechanically interconnecting said rotors, said interconnecting means being angularly adjustable relative to said generator rotor, and moving turbine blades in said turbine, each of said blades consisting of two separate members, one of said members being connected with said generator rotor, and the other one of said blade members being connected with said interconnecting means.

HANS von HORTENAU.